United States Patent
Gal et al.

(10) Patent No.: US 10,417,250 B1
(45) Date of Patent: Sep. 17, 2019

(54) SYSTEM, METHOD, AND COMPUTER PROGRAM FOR MAINTAINING DATA DEPENDENCIES DURING DATA TRANSFORMATION

(71) Applicant: Amdocs Development Limited, Limassol (CY)

(72) Inventors: Eitan Gal, Tel-Aviv (IL); Nir Pedhazur, Petah Tikva (IL); Oren Kafka, Kafar Saba (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 243 days.

(21) Appl. No.: 15/409,417

(22) Filed: Jan. 18, 2017

(51) Int. Cl.
*G06F 16/00* (2019.01)
*G06F 16/25* (2019.01)
*G06Q 20/14* (2012.01)
*G06F 16/2455* (2019.01)

(52) U.S. Cl.
CPC ...... *G06F 16/254* (2019.01); *G06F 16/24568* (2019.01); *G06F 16/258* (2019.01); *G06Q 20/14* (2013.01)

(58) Field of Classification Search
CPC combination set(s) only.
See application file for complete search history.

(56) References Cited

U.S. PATENT DOCUMENTS

| | | | |
|---|---|---|---|
| 8,301,588 B2 | 10/2012 | Kannan et al. | |
| 8,584,140 B2 | 11/2013 | Walker et al. | |
| 2012/0123999 A1* | 5/2012 | Ashutosh | G06F 11/1453 707/618 |
| 2012/0124014 A1* | 5/2012 | Provenzano | G06F 16/1756 707/692 |
| 2012/0124105 A1* | 5/2012 | Provenzano | G06F 11/1453 707/813 |
| 2014/0250153 A1* | 9/2014 | Nixon | G05B 15/02 707/812 |
| 2015/0039656 A1 | 2/2015 | Mendes et al. | |
| 2016/0210202 A1* | 7/2016 | Sinha | G06F 16/00 |

FOREIGN PATENT DOCUMENTS

EP    3016004 A1    5/2016

* cited by examiner

*Primary Examiner* — Farhan M Syed
(74) *Attorney, Agent, or Firm* — Zilka-Kotab, P.C.

(57) ABSTRACT

A system, method, and computer program product are provided for performing real-time data model transformations. In operation, a data transformation system receives data from one or more source streams of data. The data transformation system identifies one or more target storage areas to store the data. The data transformation system identifies dependencies associated with the data based on relationship metadata associated with the data. Further, the data transformation system automatically transforms the data into a format associated with the one or more target storage areas such that the dependencies associated with the data are maintained. Moreover, the data transformation system stores the transformed data in the one or more target storage areas in the format associated with the one or more target storage areas such that the dependencies associated with the data are maintained.

18 Claims, 8 Drawing Sheets

SYSTEM, METHOD, AND COMPUTER PROGRAM FOR MAINTAINING DATA DEPENDENCIES DURING DATA TRANSFORMATION

FIELD OF THE INVENTION

The present invention relates to performing data model transformations, and more particularly to performing data model transformations efficiently while maintaining dependencies associated with the corresponding data.

BACKGROUND

Maintaining business continuity for reporting and data management is especially challenging as ongoing changes and upgrades of operational systems (such as billing, care and ordering, etc.) trigger significant disruption and costs. These changes typically require a service provider to redesign source to target mapping from the operational systems, rebuild the ETLs, and develop new reports. Business users may wait many months until the reports and dashboards needed are restored.

There is thus a need for addressing these and/or other issues associated with the prior art.

SUMMARY

A system, method, and computer program product are provided for performing real-time data model transformations. In operation, a data transformation system receives data from one or more source streams of data. The data transformation system identifies one or more target storage areas to store the data. The data transformation system identifies dependencies associated with the data based on relationship metadata associated with the data. Further, the data transformation system automatically transforms the data into a format associated with the one or more target storage areas such that the dependencies associated with the data are maintained. Moreover, the data transformation system stores the transformed data in the one or more target storage areas in the format associated with the one or more target storage areas such that the dependencies associated with the data are maintained.

DETAILED DESCRIPTION

Figure 1:
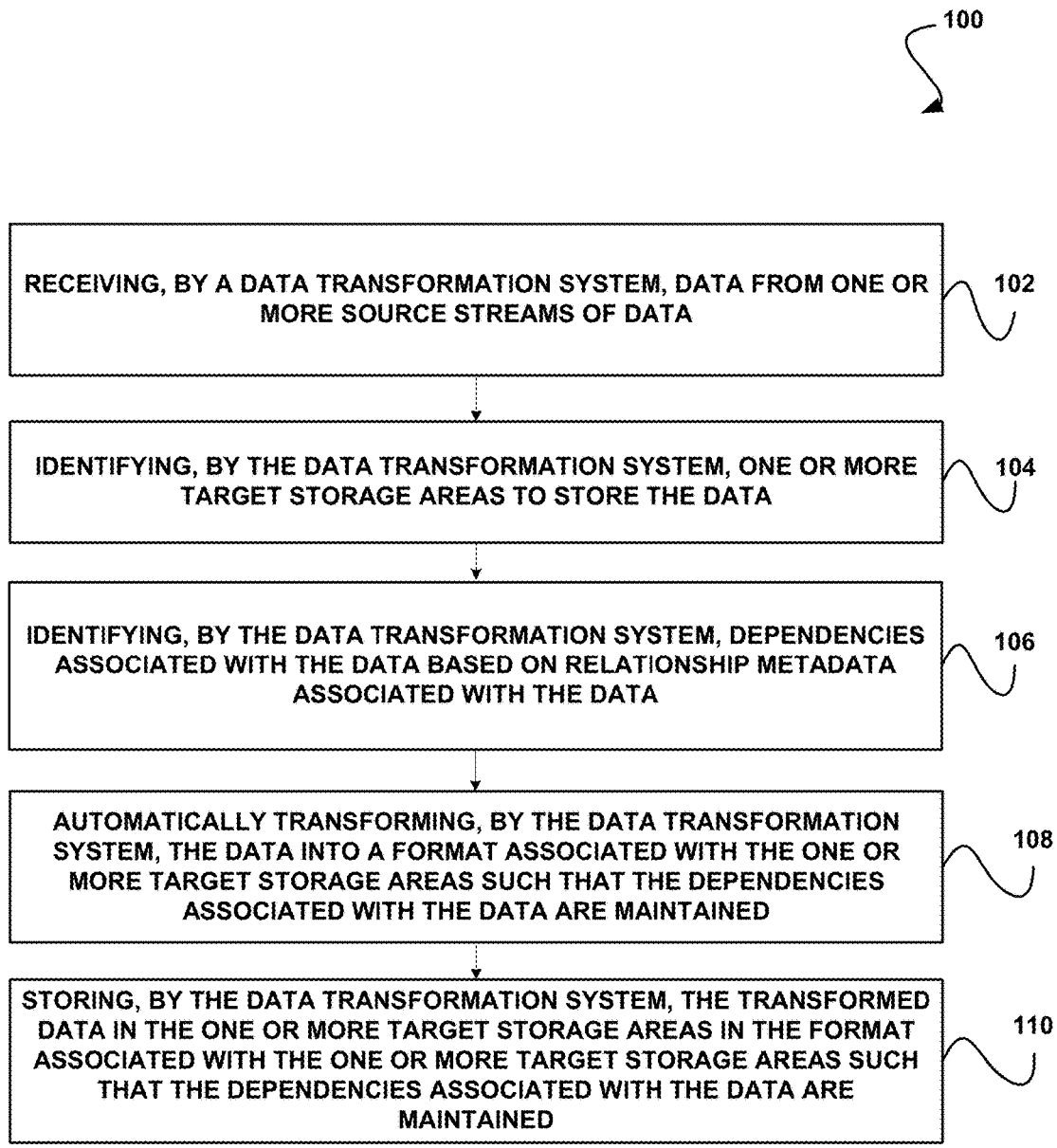
FIG. 1 illustrates a method for performing real-time data model transformations, in accordance with one embodiment.

FIG. 1 illustrates a method 100 for performing real-time data model transformations, in accordance with one embodiment.

In operation, a data transformation system receives data from one or more source streams of data. See operation 102. The data may include files, records, and/or any other types of data.

The data may be received from one or more systems associated with various industries. For example, in one embodiment, the systems may be associated with the telecommunication industry. The systems may include, for example, billing systems, ordering systems, customer management systems, and/or various other systems.

The data transformation system identifies one or more target storage areas to store the data. See operation 104. The target storage areas may include any database, repository, or memory.

The target storage areas may include an intermediate storage area for pre-transformation data, such as a random access store (e.g. an Apache HBASE database, etc.) or a target store for post transformation storage, which can be any type of store (e.g. HBASE, HIVE, HDFS, Elastic Search, etc.). For example, in one embodiment, data needed for immediate access may be stored by the data transformation system in an intermediate database such as HBASE and other data not requiring immediate access may be stored in another database.

The data transformation system identifies dependencies associated with the data based on relationship metadata associated with the data. See operation 106. The relationship metadata may include any data indicating relationships between data, entities (e.g. parent/child entities, etc.), and/or objects, etc.

Further, the data transformation system automatically transforms the data into a format associated with the one or more target storage areas such that the dependencies associated with the data are maintained. See operation 108. This may include, for example, integrating data from multiple systems into one record while maintaining the dependencies associated with the data.

Additionally, in one embodiment, automatically transforming the data into the format associated with the target storage areas may include transforming the data into a format associated with a remote procedure call and data serialization framework (e.g. Apache Avro, parquet or ORC, etc.).

In one embodiment, identifying dependencies associated with the data based on the relationship metadata associated with the data may include maintaining at least one index enabling a parent entity associated with the data to link to all children entities associated with the parent entity by utilizing a parent identifier associated with the parent entity. In this case, automatically transforming the data into the format associated with the target storage areas may include utilizing the relationship metadata and the index to find all related entities by at least one key associated with the index and executing a pre-configured Structured Query Language (SQL) script to transform the data into the format associated with the target storage areas.

In either case, the data transformation system stores the transformed data in the one or more target storage areas in the format associated with the one or more target storage areas such that the dependencies associated with the data are maintained. See operation 110.

It should be noted that the method 100 may be implemented utilizing various systems, hardware, software, applications, user interfaces, etc., as dictated by the implementer. For example, the data transformation system may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
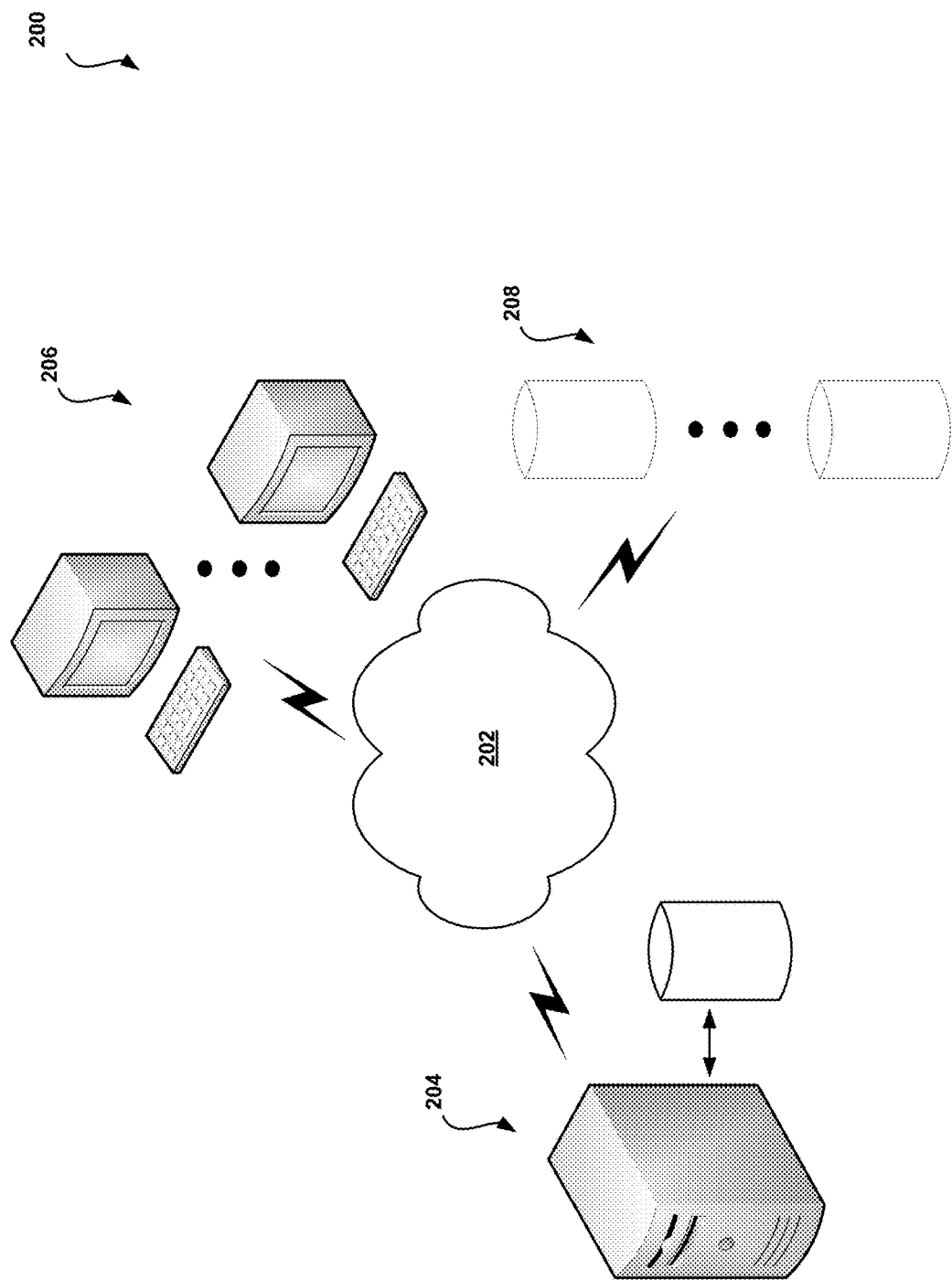
FIG. 2 shows a system for performing real-time data model transformations, in accordance with one embodiment.

FIG. 2 shows a system 200 for performing real-time data model transformations, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a data transformation system 204 which may implement a variety of applications or software, etc. The data transformation system 204 may be capable of communicating with a plurality of systems 206, either directly or over one or more networks 202, for performing data transformations from various sources of data.

The data transformation system 204 is also in communication with one or more repositories/databases 208, which may serve as target storage areas for transformed and formatted data. In one embodiment, the data transformation system 204 may be part of a data hub system that provides data processing services for a variety of telecommunication systems, such as billing systems, ordering systems, and/or customer resource management (CRM) systems, etc. Further, in one embodiment, the data transformation system 204 may utilize a software module called a transformation engine.

In operation, the data transformation system 204 may receive data streams from the plurality of systems 206. In one embodiment, near real time data flow may be enabled through the use of change data capture (CDC) (e.g. as well as Kafka and Spark technologies, etc.).

After collection from the source systems 206, data may be stored by the data transformation system 204. Data needed for immediate access or data that rarely changes, such as look up data, may be stored by the data transformation system 204 in an intermediate database (e.g. in HBase, etc.) such that transformations may be performed. In one embodiment, the data transformation system 204 may store data in a landing zone 208 on a Hadoop Distributed File System (HDFS) in Parquet or ORC format, implementing a Logical Data Model (LDM), such as Amdocs Logical Data Model (aLDM), etc.

In one embodiment, the data may be stored by the data transformation system 204 in HDFS in various formats, enabling access through other systems (e.g. Hive and/or Impala, etc., depending on the Hadoop distribution, etc.). Of course, in one embodiment, all data may be stored in the same format and the same database(s) after the required data transformations.

The data transformation system 204 may use change data capture or other source information for entity changes. The data transformation system 204 may store to a temporary UPSERT supporting intermediate store and obtain the full entity information in the case only part of the entity data was provided as part of the change description. The data transformation system 204 may identify all pre-configured contexts that are impacted by that entity change, per impacted context.

Based on relationship metadata, the data transformation system 204 may maintain an index in the intermediate store enabling the data transformation system 204 to link a parent entity to all children entities in order to find such entity (e.g. utilizing a parent ID, etc.). Using relationship metadata and indexes, the data transformation system 204 is able to find all related entities by key and load them into an in-memory SQL engine.

The data transformation system 204 may run a pre-configured SQL script to perform a transformation of the data into a new target entity based on the full context. The data transformation system 204 may then store the transformed target entity to its target store.

By keeping the source data model and relation information, the data transformation system 204 is able to direct all related data into memory on an entity change event and perform a transformation (e.g. from SQL, etc.) to a target structure based on the changed entity and related data.

Figure 3:
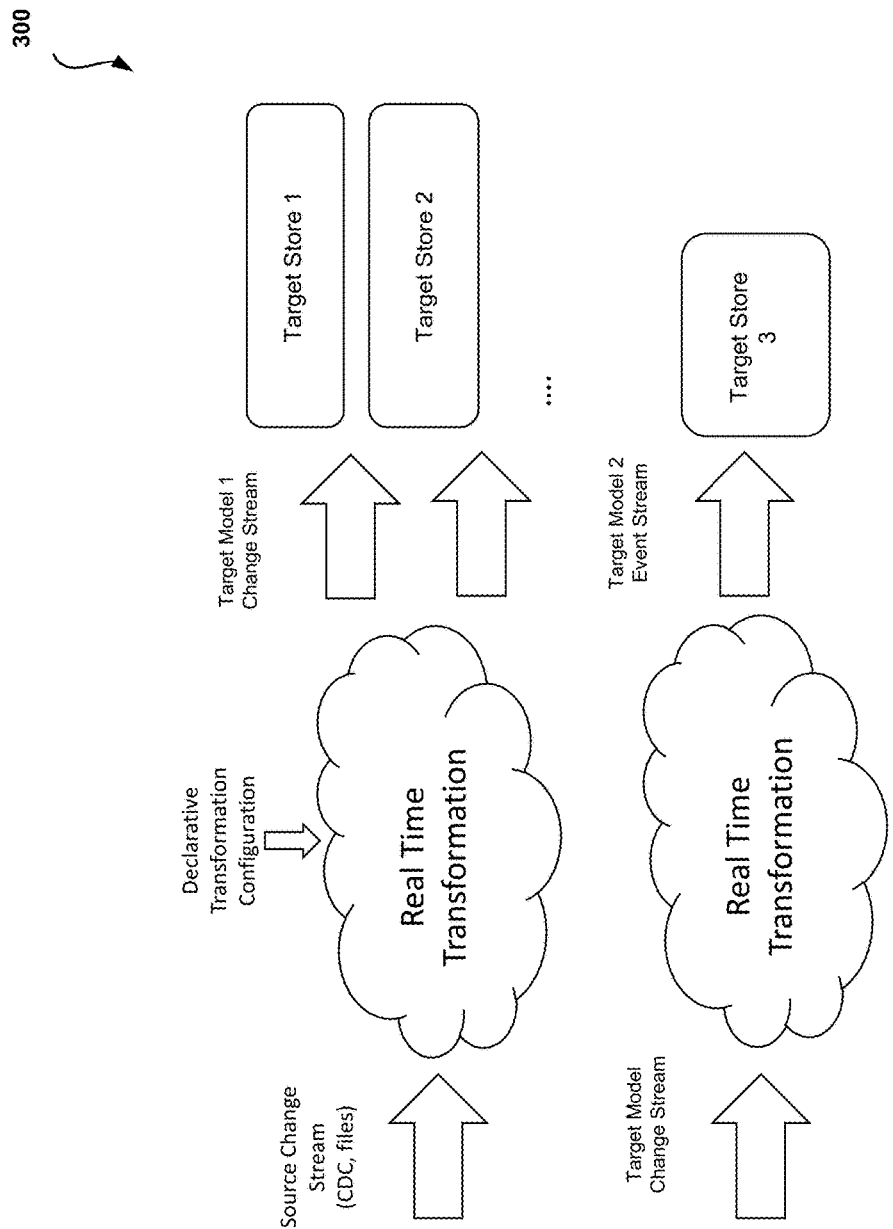
FIG. 3 illustrates a system flow diagram for real-time data publishing, in accordance with one embodiment.

FIG. 3 shows a system flow diagram 300 for real-time data publishing, in accordance with one embodiment. As an option, the system flow diagram 300 may be implemented in the context of the details of the previous figures and/or any subsequent figure(s). Of course, however, the system flow diagram 300 may be implemented in the context of any desired environment. Further, the aforementioned definitions may equally apply to the description below.

As shown, a source change stream (e.g. CDC, files, etc.) is received from one or more sources. A data transformation system identifies a declarative transformation configuration and performs a real-time transformation based on the configuration. Logical data model (LDM) change streams including the transformed and formatted data are sent to the storage targets (e.g. real-time targets, etc.). As shown further, the data transformation system may take the LDM change streams and generate another transformation target event stream that is fed to an event processing system.

Figure 4:
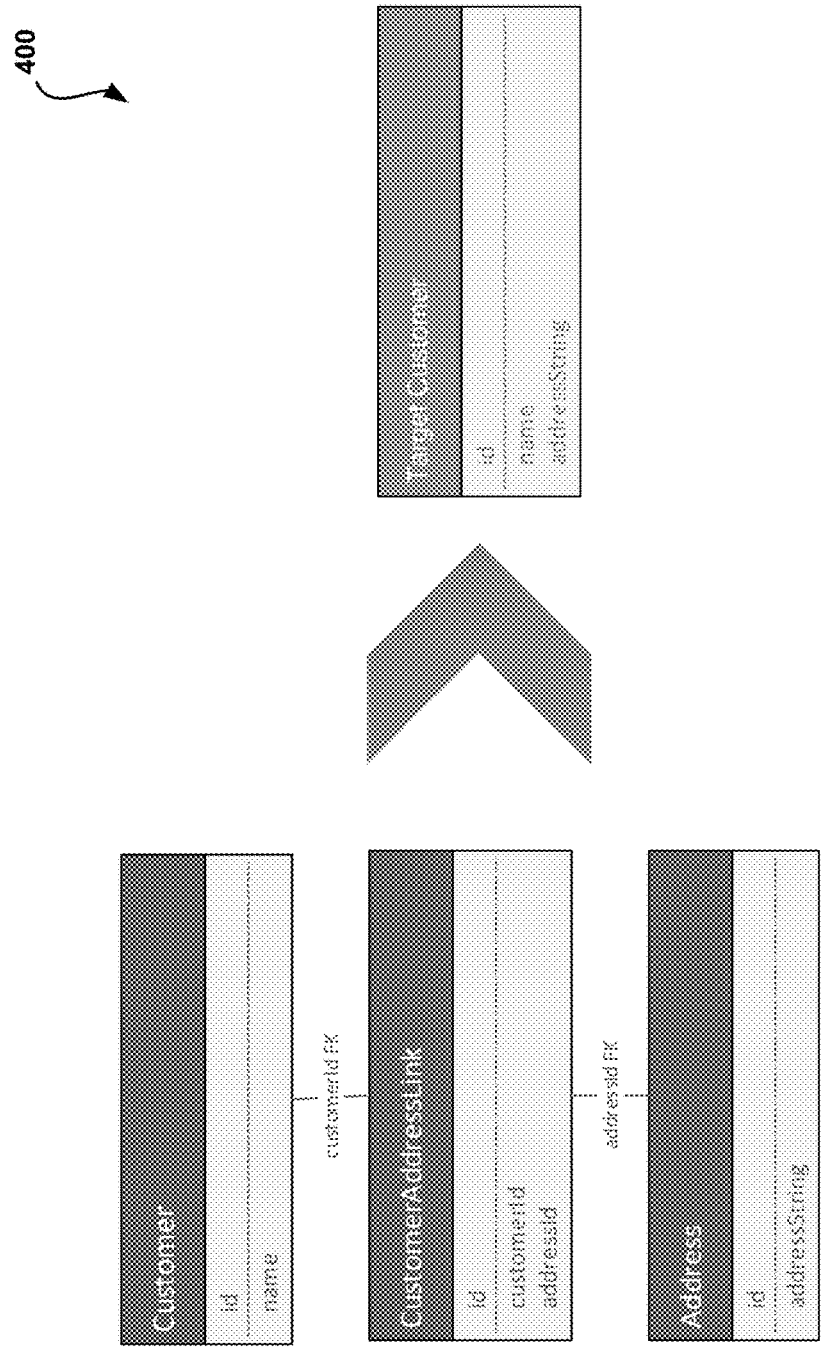
FIG. 4 shows an example of a data structure transformation, in accordance with one embodiment.

FIG. 4 shows an example 400 of a data structure transformation, in accordance with one embodiment. As an option, the example 400 may be implemented in the context of the details of the previous figures and/or any subsequent figure(s). Of course, however, the example 400 may be implemented in the context of any desired environment. Further, the aforementioned definitions may equally apply to the description below.

As shown, various customer records from various systems may be received and transformed into a logical data model that integrates the records. Of course, this is only one example of how a data transformation system implementing the techniques described herein may transform data in real-time while maintaining dependencies.

Figure 5:
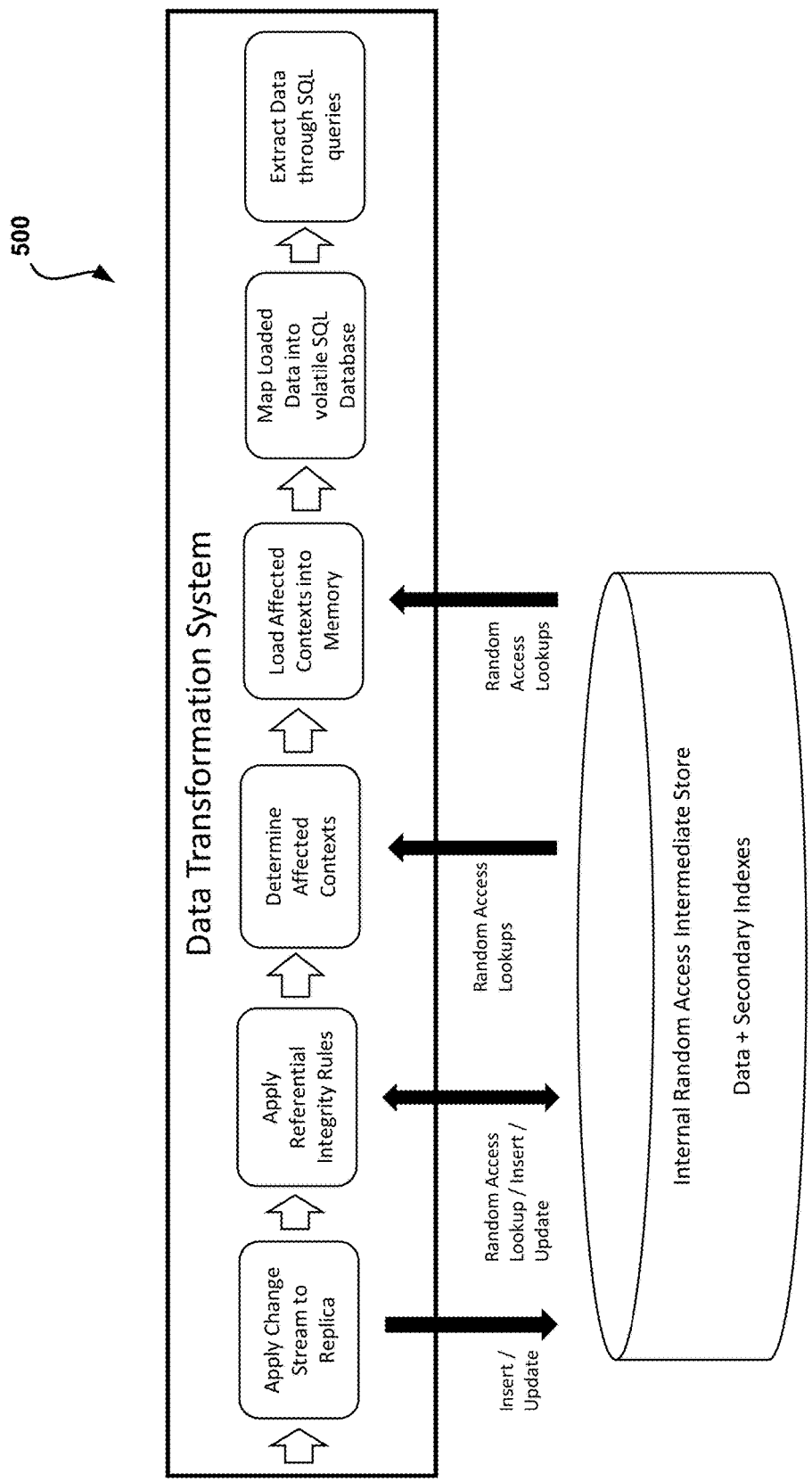
FIG. 5 shows a system flow diagram for real-time data publishing, in accordance with one embodiment.

FIG. 5 shows a system flow diagram 500 for real-time data publishing, in accordance with one embodiment. As an option, the system flow diagram 500 may be implemented in the context of the details of the previous figures and/or any subsequent figure(s). Of course, however, the system flow diagram 500 may be implemented in the context of any desired environment. Further, the aforementioned definitions may equally apply to the description below.

As shown, a data transformation system applies a change stream to an Internal Random Access Intermediate Store. Further, the data transformation system applies referential integrity rules such that data dependencies are maintained. Additionally, the data transformation system determines affected contexts. The data transformation system the loads the affected contexts into memory. In addition, the data transformation system maps loaded data into a volatile SQL database. The transformed data may then be extracted through SQL queries.

Figure 6:
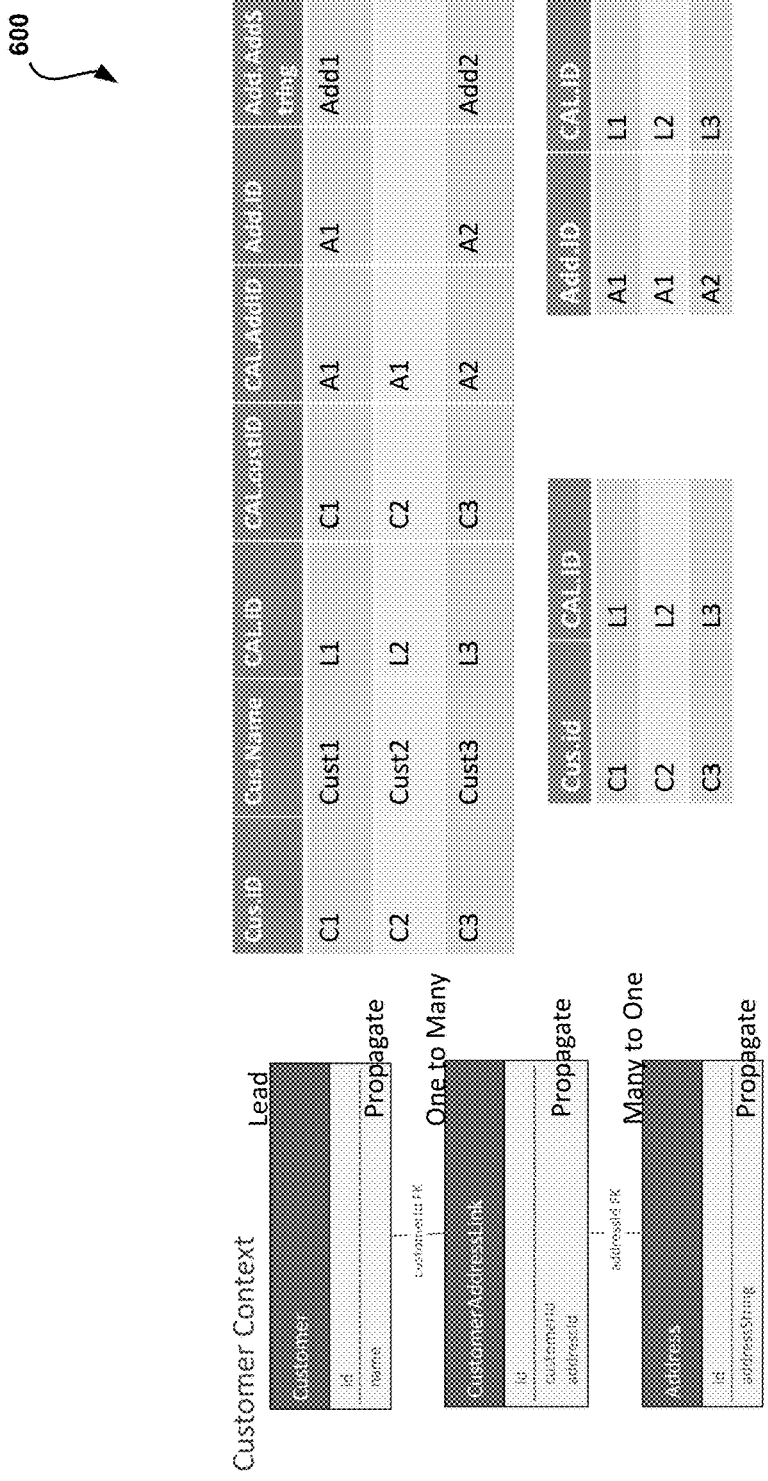
FIG. 6 shows an example of a real time publisher configuration and example data, in accordance with one embodiment.

FIG. 6 shows an example 600 of a real time publisher configuration and example data, in accordance with one embodiment. As an option, the example 600 may be implemented in the context of the details of the previous figures and/or any subsequent figure(s). Of course, however, the example 600 may be implemented in the context of any desired environment. Further, the aforementioned definitions may equally apply to the description below.

As an example, in operation, a change to Address A1 may be received by a data transformation system. The data transformation system identifies the Address as propagated in the customer context. The data transformation system finds the related customerAddressLink by address ID index (found L1, L2). The data transformation system continues up to "Lead" entity and finds C1 and C2. The data transformation system loads C1, C2, L1, L2, and A1 to memory. Further, the data transformation system runs the publishing query. This results in two LDM customer updates to C1 and C2.

As another example, in operation, a change to Customer C1 may be received by the data transformation system. The data transformation system identifies the Customer as propagated in the customer context. The data transformation system finds the related links L1 by customer ID index. The data transformation system continues down to find A1 from L1 CAL. The data transformation system loads C1, L1, and A1 to memory. Further, the data transformation system runs the publishing query. This results in one LDM customer update to C1.

These examples describe a single target oriented transformation configuration handle change driven from multiple source entities.

Figure 7:
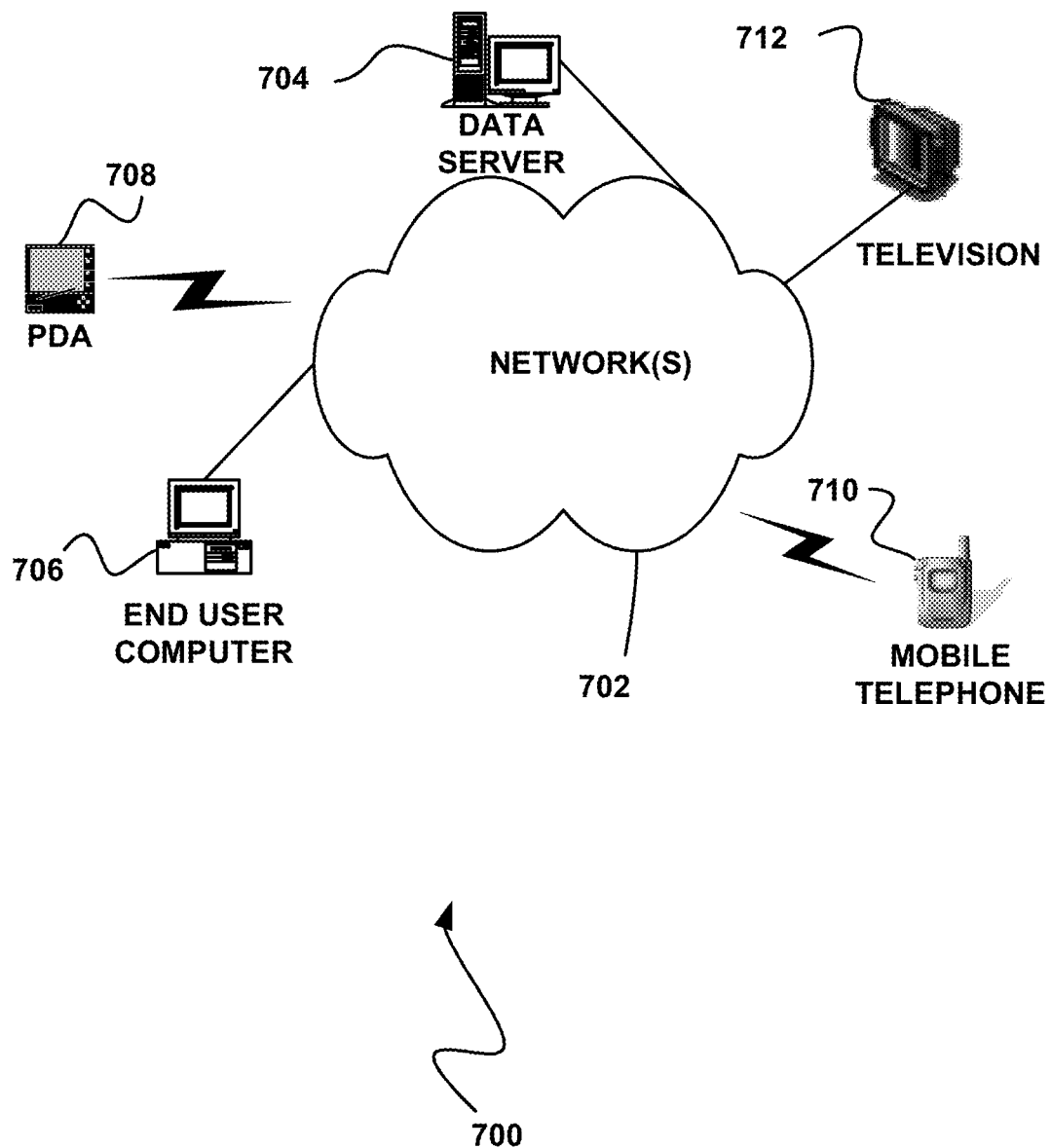
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
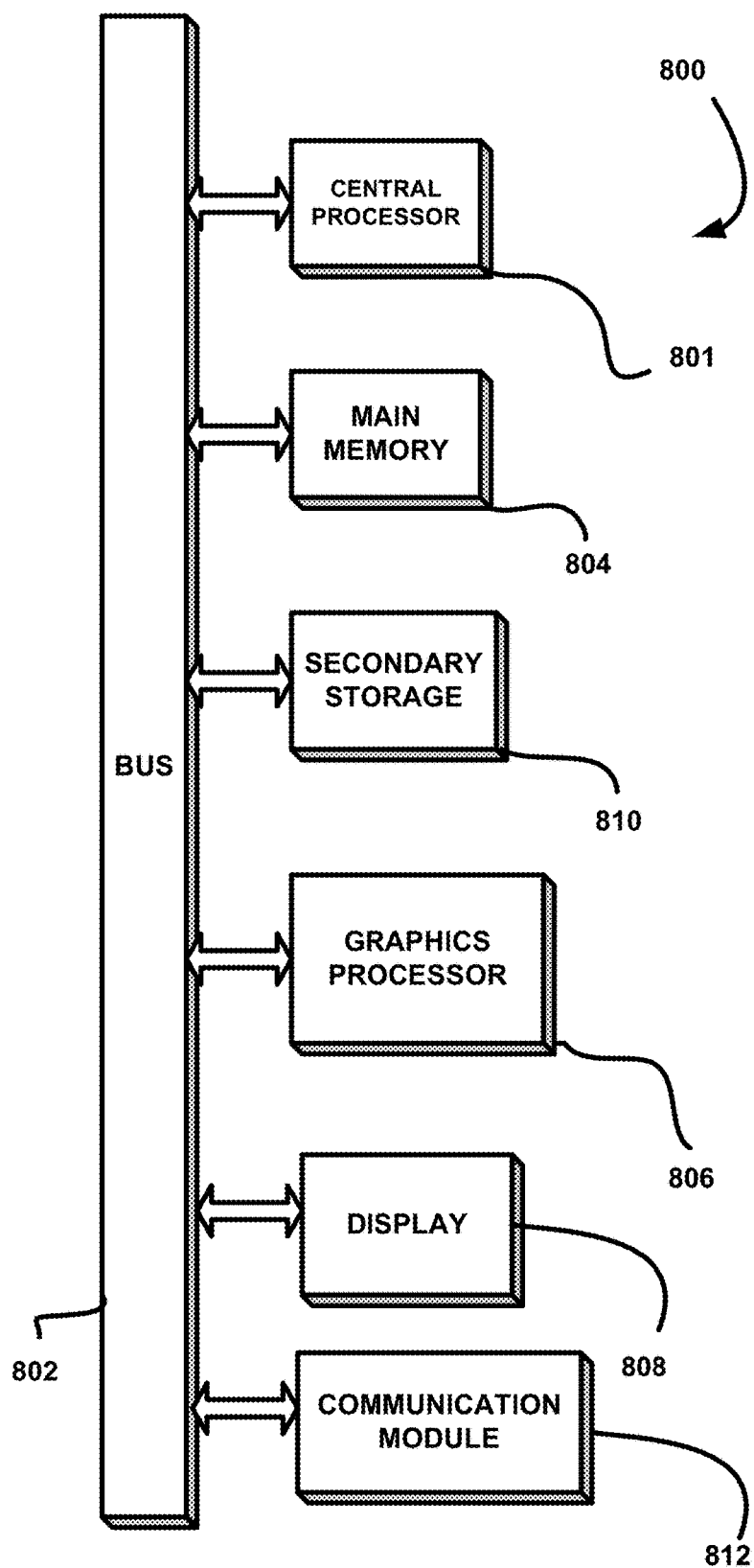
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
   receiving, by a data transformation system, data from one or more source streams of data;
   receiving, by the data transformation system, a change event associated with the data, the change event indicating a change made to the data;
   identifying, by the data transformation system, dependencies associated with the data based on relationship metadata associated with the data;
   identifying, by the data transformation system, additional data related to the data via the dependencies, wherein the additional data related to the data is at least one of: one or more parent entities to the data or one or more child entities to the data;
   responsive to the change event, directing the data and the additional data related to the data into memory for performing an automatic transformation thereof;
   identifying, by the data transformation system, one or more target storage areas to store the data;
   automatically transforming, by the data transformation system, the data and the additional data into a format associated with the one or more target storage areas such that the dependencies associated with the data are maintained in the transformed data; and
   storing, by the data transformation system, the transformed data in the one or more target storage areas in the format associated with the one or more target storage areas such that the dependencies associated with the data are maintained in the one or more target storage areas.

2. The computer program product of claim 1, wherein the data from the one or more source streams of data includes one or more files.

3. The computer program product of claim 1, wherein the data from the one or more source streams of data includes data associated with a system database model.

4. The computer program product of claim 1, wherein the data from the one or more source streams of data includes data associated with a billing system.

5. The computer program product of claim 1, wherein the data from the one or more source streams of data includes data associated with an ordering system.

6. The computer program product of claim 1, wherein the data from the one or more source streams of data includes data associated with a customer management system.

7. The computer program product of claim 1, wherein automatically transforming the data into the format associated with the one or more target storage areas includes integrating data from multiple systems into one record while maintaining the dependencies associated with the data.

8. The computer program product of claim 1, wherein automatically transforming the data into the format associated with the one or more target storage areas such that the dependencies associated with the data are maintained includes transforming the data into a format associated with a remote procedure call and data serialization framework.

9. The computer program product of claim 8, wherein the remote procedure call and data serialization framework includes parquet or ORC.

10. The computer program product of claim 1, wherein identifying dependencies associated with the data based on the relationship metadata associated with the data includes maintaining at least one index enabling a parent entity associated with the data to link to all children entities associated with the parent entity by utilizing a parent identifier associated with the parent entity.

11. The computer program product of claim 10, wherein automatically transforming the data into the format associated with the one or more target storage areas such that the dependencies associated with the data are maintained includes utilizing the relationship metadata and the at least one index to find all related entities by at least one key associated with the at least one index and executing a pre-configured Structured Query Language (SQL) script to transform the data into the format associated with the one or more target storage areas.

12. The computer program product of claim 1, wherein the one or more target storage areas include an Apache HIVE over HDFS.

13. A method, comprising:
  receiving, by a data transformation system, data from one or more source streams of data;
  receiving, by the data transformation system, a change event associated with the data, the change event indicating a change made to the data;
  identifying, by the data transformation system, dependencies associated with the data based on relationship metadata associated with the data;
  identifying, by the data transformation system, additional data related to the data via the dependencies, wherein the additional data related to the data is at least one of: one or more parent entities to the data or one or more child entities to the data;
  responsive to the change event, directing the data and the additional data related to the data into memory for performing an automatic transformation thereof;
  identifying, by the data transformation system, one or more target storage areas to store the data;
  automatically transforming, by the data transformation system, the data and the additional data into a format associated with the one or more target storage areas such that the dependencies associated with the data are maintained in the transformed data; and
  storing, by the data transformation system, the transformed data in the one or more target storage areas in the format associated with the one or more target storage areas such that the dependencies associated with the data are maintained in the one or more target storage areas.

14. The method of claim 13, wherein the data from the one or more source streams of data includes at least one of:
  one or more files,
  data associated with a system database model,
  data associated with a billing system,
  data associated with an ordering system, and
  data associated with a customer management system.

15. The method of claim 13, wherein automatically transforming the data into the format associated with the one or more target storage areas includes integrating data from multiple systems into one record while maintaining the dependencies associated with the data.

16. A data transformation system comprising one or more processors operable for:
  receiving, by the data transformation system, data from one or more source streams of data;
  receiving, by the data transformation system, a change event associated with the data, the change event indicating a change made to the data;
  identifying, by the data transformation system, dependencies associated with the data based on relationship metadata associated with the data;
  identifying, by the data transformation system, additional data related to the data via the dependencies, wherein the additional data related to the data is at least one of: one or more parent entities to the data or one or more child entities to the data;
  responsive to the change event, directing the data and the additional data related to the data into memory for performing an automatic transformation thereof;
  identifying, by the data transformation system, one or more target storage areas to store the data;
  automatically transforming, by the data transformation system, the data and the additional data into a format associated with the one or more target storage areas such that the dependencies associated with the data are maintained in the transformed data; and
  storing, by the data transformation system, the transformed data in the one or more target storage areas in the format associated with the one or more target storage areas such that the dependencies associated with the data are maintained in the one or more target storage areas.

17. The computer program product of claim 1, wherein the additional data related to the data includes the one or more parent entities to the data.

18. The computer program product of claim 1, wherein the additional data related to the data includes the one or more child entities to the data.

* * * * *